Dec. 6, 1927.

J. G. AYERS 1,651,798

ROLLER BEARING

Filed May 9, 1924

Fig. 3ᵃ

Inventor:
Joseph G. Ayers,
by
his Attorney.

Patented Dec. 6, 1927.

1,651,798

UNITED STATES PATENT OFFICE.

JOSEPH G. AYERS, OF MONTCLAIR, NEW JERSEY, ASSIGNOR TO GENERAL MOTORS CORPORATION, OF DETROIT, MICHIGAN, A CORPORATION OF DELAWARE.

ROLLER BEARING.

Application filed May 9, 1924. Serial No. 712,019.

This invention relates to roller bearings and is herein illustrated by reference to a sheet metal cage for cylindrical rollers and a method of constructing the cage.

It is quite common in the art to retain rollers in a sleeve by means of flaps struck out from the sleeve and curved about the rollers to guide the same. Such flaps occupy considerable circumferential space between the rollers, thus reducing the number of rollers that can be carried and so diminishing the capacity of the bearing for load. The flaps are also easily bent out of position thus allowing displacement of the rotation axes of the rollers and resulting in rapid failure of the bearing. In the copending application of William H. Chapman, Serial No. 712,029, filed of even date herewith, the roller capacity is increased somewhat by dispensing with the use of the flaps as roller guides and using hardened trunnions on end rings as guides for the rollers. The flaps can then be brought closer together between the rollers to form strong bridge pieces which do not touch the rollers. According to the present invention, the capacity of the cage for rollers reaches a maximum by spacing the rollers so as to just clear one another and by so shaping the bridge pieces that strong cross connections are nevertheless formed in the decreased space available between the peripheries of adjacent rollers.

It is an object of the invention, therefore, to provide an improved cage having the maximum capacity for rollers. Another object is to provide an efficient cage which is both light and strong. To these ends and also to improve generally on devices of the character indicated, the invention also consists in the various matters hereinafter described and claimed.

Referring to the drawings Figure 1 is a side elevation in half section of the cage and its assembled rollers.

Figure 1:
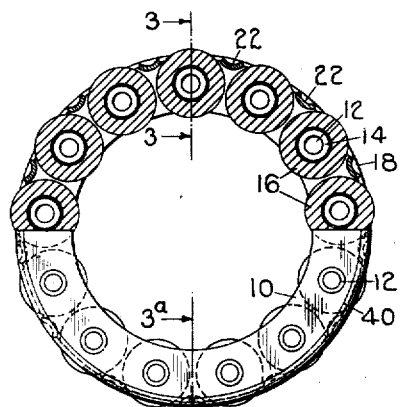
Figure 2:
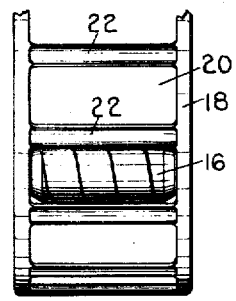
Figure 2 is a partial front view of the cage.
Figure 3:
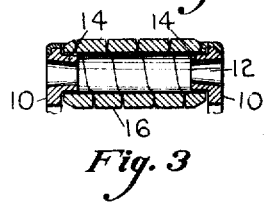
Figure 3 is a section on the line 3—3 of Figure 1.

Figure 3ª is a section on the line 3ª—3ª of Figure 1.

Figure 4:
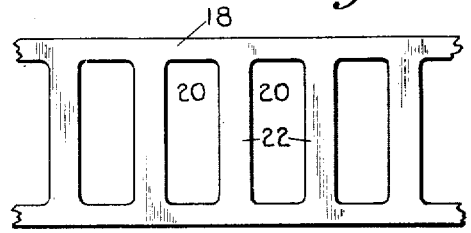

Figure 4 is a plan view of a strip from which the cage is formed, after the roller receiving openings have been punched therein.

Figure 5:
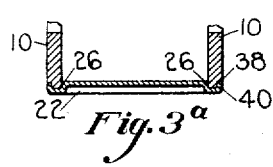
Figure 5:
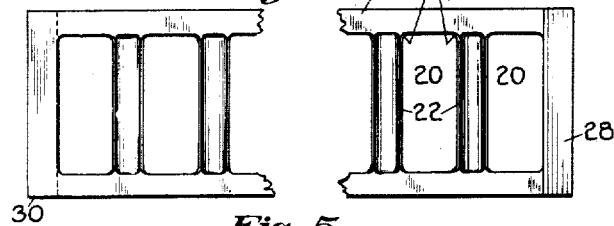

Figure 5 is a plan view of the strip after the bridge pieces have been crimped.

Figure 6:
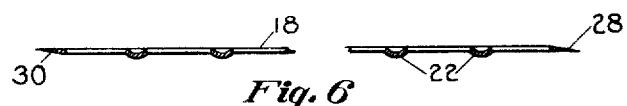

Figure 6 is an edge view of the strip of Figure 5.

Figure 7:
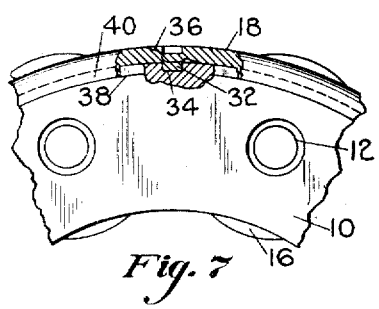

Figure 7 is an enlarged side elevation, partly broken away and in section and

Figure 8:
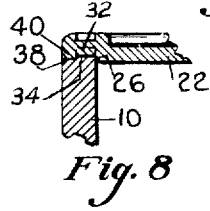

Figure 8 is a vertical section showing the joint between one of the end rings and the band.

Numeral 10 indicates opposite end rings, each having a series of tapered openings 12 formed therethrough. The openings are formed in the operation of punching out hollow sleeve-like projections or trunnions 14 which are hardened to guide the inner surfaces of hollow rollers 16. These rollers are here shown as of the helically wound type which are made on an arbor and therefore adapted to rotate on cylindrical trunnions. There is a slight clearance between the trunnions and the bore of the rollers, such that the cage can float on the rollers without contacting with either the inner or outer race rings. The hollow trunnions also leave unobstructed passages from one side of the cage to the other so that the bearing is easily cleaned and oil can be conveniently introduced.

Surrounding and uniting the end rings is a circular band or sleeve 18 having a series of roller receiving openings 20 alternating with bridge pieces 22. As shown in Figures 4 and 5 the band is formed from a flat strip and the openings 20 are sheared out therefrom and are of substantially rectangular form, with the corners rounded as indicated at 24. This strengthens the connections between the bridge pieces and the band and accommodates the ends of the rollers which are correspondingly chamfered. The bridge pieces are next crimped to make them of substantially trough-like formation and, when the strip is bent into a band, these bridge pieces have their concave sides facing radially outwards and occupy the substantially V-shaped spaces between the rollers entirely outside of the points of nearest approach of adjacent rollers. This allows the rollers to be assembled in an uninterrupted circular series with the adjacent rollers just clearing one another and not coming in contact with the bridge pieces. These bridge pieces form strong cross connections also and take up none of the circumferential space required by the rollers.

In the operation of crimping the bridge pieces, shoulders 26 are formed at the ends of the troughs, these shoulders spacing the end rings apart at a predetermined distance. The ends of the strip from which the band is formed are scarfed as indicated at 28 and 30 and these scarfed ends are united by welding. The end bridge piece formed by these scarfed ends is crimped after the band is formed and, in the same operation, lugs 32 are pressed into the ends of this bridge piece. The lugs are arranged to enter complemental notches 34 formed on the outer edges of the end rings 10 as shown in Figures 7 and 8. The line of the weld between the scarfed ends of the band is indicated roughly at 36. The purpose of the lugs and notches is to position the end rings exactly opposite one another with the trunnions exactly in alignment. When the rollers have been assembled on the trunnions and the end rings have been moved inside the band against the shoulders 26, the edges of the band are spun downwardly as indicated at 40 into annular recesses 38 at the outer edges of the end rings.

Although the invention has been illustrated by reference to specific steps and specific construction, it should be understood, that, in its broader aspects, it is not necessarily limited thereto.

I claim:

1. In a roller bearing having the maximum complement of rollers, an uninterrupted series of rollers arranged in a circular series with the peripheries of adjacent rollers just clearing one another, and a cage for the rollers comprising a circular metal band having openings for the rollers and reinforcing bridge pieces alternately arranged, said bridge pieces having a trough-like formation, the concave sides of the troughs facing radially outwards and the troughs being outside of the points of nearest approach of adjacent rollers and occupying the V-shaped spaces formed by the rollers and being out of contact therewith, and means for rotatably supporting the rollers; substantially as described.

2. In a roller bearing having the maximum complement of rollers, an uninterrupted series of rollers arranged in a circular series with the peripheries of adjacent rollers just clearing one another, and a cage for the rollers comprising a circular sheet metal band having openings for the rollers and reinforcing bridge pieces, said bridge pieces having a trough-like formation with the concave sides of the troughs facing radially outwards and the troughs occupying the V-shaped spaces formed by the rollers and being out of contact therewith, and end rings secured inside the band against the inner surface thereof; substantially as described.

3. In a roller bearing having rollers arranged in a circular series, a cage for the rollers comprising a circular band having openings for the rollers and reinforcing bridge pieces with a trough-like formation, the concave sides of the troughs facing radially outwards and the troughs being outside of the nearest points of approach of adjacent rollers and out of contact with the rollers, and end rings secured to the band and having roller supporting and guiding means; substantially as described.

4. In a roller bearing having rollers arranged in a circular series, a cage for the rollers comprising a circular band having openings for the rollers and reinforcing bridge pieces having a trough-like formation, the concave sides of the troughs facing radially outwards and the troughs being out of contact with the rollers, and end rings secured to the band, said end rings guiding the rollers and abutting against the ends of said troughs; substantially as described.

5. In a roller bearing having rollers arranged in a circular series, a cage for the rollers comprising a circular band having openings for the rollers and reinforcing bridge pieces having a trough-like formation, the concave sides of the troughs facing radially outwards and the troughs being out of contact with the rollers, end rings secured to the band and abutting against the ends of said troughs, and cylindrical trunnions projecting from the rings for supporting and guiding said rollers; substantially as described.

6. In a roller bearing, a series of rollers, a cage comprising a pair of opposed end rings having means for supporting and guiding the rollers in a compact circular series with the peripheries of adjacent rollers just clearing one another, and a band surrounding the end rings and having openings for the rollers, cooperating lugs and depressions formed on the inner surface of the band and at the outer edges of the end rings, said band having bridge pieces extending between the rings, and said bridge pieces having their middle portions pressed inwardly into the V-shaped spaces formed by the adjacent rollers outside their points of nearest approach; substantially as described.

7. A bearing having a series of rollers so set that the peripheries of adjacent rollers just clear each other, and a cage for said rollers comprising a strip having roller-receiving openings separated by bridge pieces whose middle portions are depressed into troughs concave outwardly, said bridge pieces lying outside of the points of closest approach between rollers and having a width no greater than that of the space which at the line of the bridge pieces results between rollers from the said close setting of such rollers, whereby maximum roller capacity is afforded with maximum strength of bridge piece in the relatively restricted space resulting from the use of such maximum number of rollers; substantially as described.

In testimony whereof I hereunto affix my signature.

JOSEPH G. AYERS.

pieces lying outside of the points of closest approach between rollers and having a width no greater than that of the space which at the line of the bridge pieces results between rollers from the said close setting of such rollers, whereby maximum roller capacity is afforded with maximum strength of bridge piece in the relatively restricted space resulting from the use of such maximum number of rollers; substantially as described.

In testimony whereof I hereunto affix my signature.

JOSEPH G. AYERS.

CERTIFICATE OF CORRECTION.

Patent No. 1,651,798.  Granted December 6, 1927, to

JOSEPH G. AYERS.

It is hereby certified that error appears in the printed specification of the above numbered patent requiring correction as follows: Page 1, line 37, before the word "To" insert the words and period "Another object is to produce a simple form of cage that can be constructed at low cost."; and that the said Letters Patent should be read with this correction therein that the same may conform to the record of the case in the Patent Office.

Signed and sealed this 17th day of January, A. D. 1928.

Seal.

M. J. Moore,
Acting Commissioner of Patents.

CERTIFICATE OF CORRECTION.

Patent No. 1,651,798.

Granted December 6, 1927, to

JOSEPH G. AYERS.

It is hereby certified that error appears in the printed specification of the above numbered patent requiring correction as follows: Page 1, line 37, before the word "To" insert the words and period "Another object is to produce a simple form of cage that can be constructed at low cost."; and that the said Letters Patent should be read with this correction therein that the same may conform to the record of the case in the Patent Office.

Signed and sealed this 17th day of January, A. D. 1928.

Seal.

M. J. Moore,
Acting Commissioner of Patents.